(12) United States Patent
Johansson

(10) Patent No.: US 11,043,027 B2
(45) Date of Patent: Jun. 22, 2021

(54) THREE-DIMENSIONAL GRAPHICS IMAGE PROCESSING

(71) Applicant: Microsoft Technology Licensing, LLC, Redmond, WA (US)

(72) Inventor: Erik Gustaf Anders Johansson, Linköping (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/702,740

(22) Filed: Sep. 12, 2017

(65) Prior Publication Data
US 2019/0080512 A1 Mar. 14, 2019

(51) Int. Cl.
*G06T 17/20* (2006.01)
*G06T 9/00* (2006.01)

(52) U.S. Cl.
CPC .......... *G06T 17/205* (2013.01); *G06T 9/001* (2013.01); *G06T 2210/36* (2013.01)

(58) Field of Classification Search
CPC .......................... G06T 17/205; G06T 2210/36
See application file for complete search history.

(56) References Cited

U.S. PATENT DOCUMENTS

| | | | | |
|---|---|---|---|---|
| 5,945,996 A * | 8/1999 | Migdal | ................... | G06T 17/20 345/420 |
| 6,198,486 B1 | 3/2001 | Junkins et al. | | |
| 6,630,932 B1 * | 10/2003 | Grzeszczuk | .......... | G06T 17/005 345/420 |
| 2003/0052875 A1 * | 3/2003 | Salomie | .................. | G06T 17/20 345/419 |
| 2013/0300741 A1 * | 11/2013 | Schmidt | .................. | G06T 17/20 345/420 |

OTHER PUBLICATIONS

Turk et al., Zippered Polygon Meshes from Range Images Jul. 24, 1994, SIGGRAPH, ACM 1994 ISBN: 0-89791-667-0, pp. 1-8 (Year: 1994).*
Schaefer et al., Manifold Dual Contouring; IEEE Transactions On Visualization and Computer Graphics, vol. 13, No. 3, May/Jun. 2007, pn 1-10 (Year: 2007).*
"Mesh simplification", available at http://graphics.stanford.edu/courses/cs468-10-fall/LectureSlides/08_Simplification.pdf, retrieved on Sep. 11, 2017, 62 pages.

(Continued)

*Primary Examiner* — Samantha (Yuehan) Wang

(57) ABSTRACT

In various examples there is a computer-implemented method for forming an optimized three-dimensional model for a three-dimensional graphics image. The method comprises: obtaining the three-dimensional graphics image, the three-dimensional graphics image represented as at least one polygon mesh having a plurality of vertices connected by edges. The method selects one or more of the vertices to be removed by collapse decimation operation, the selection based on an amount of change in the polygon mesh introduced as a result of the decimation operation. The amount of change is computed using information about intersections where two different faces of the polygon mesh pass through one another.

20 Claims, 10 Drawing Sheets

(56) References Cited

OTHER PUBLICATIONS

Bajaj, et al., "Error-Bounded Reduction of Triangle Meshes With Multivariate Data", In Proceedings of International Society for Optics and Photonics, vol. 2656, Visual Data Exploration and Analysis III, Mar. 8, 1996, 9 Pages.

Park, et al., "Shape-adaptive 3-D Mesh Simplification Based on Local Optimality Measurement", Published in the Journal of Visualization and Computer Animation, vol. 14, Issue 2, May 2003, pp. 93-109.

"International Search Report and Written Opinion Issued in PCT Application No. PCT/US2018/038885", dated Jun. 3, 2019, 18 Pages.

"Invitation to Pay Additional Fee Issued in PCT Application No. PCT/US2018/038885", dated Sep. 26, 2018, 14 Pages.

Vivodtzev, et al., "Topology-preserving Simplification of 2D Nonmanifold Meshes With Embedded Structures", Published in The Visual Computer, vol. 21, Issue 8-10, Sep. 2005, pp. 679-688.

\* cited by examiner

THREE-DIMENSIONAL GRAPHICS IMAGE PROCESSING

BACKGROUND

The technology generally relates to computer graphics and more specifically to a computer-implemented method for forming an optimized polygon mesh for a three-dimensional graphics image.

Image processing systems for generating computer graphics are used in a wide variety of domains such as computer aided design, architecture, medical visualization, computer games, augmented reality, virtual reality and others. Three dimensional objects or scene surfaces are represented using polygon mesh models from which the image processing systems render images and video. To enable users to interactively navigate the computer model or scene the image processing system seeks to operate in real time such as at speeds greater than ten frames per second and preferably around 30 frames per second.

Where highly complex polygon mesh models are involved, such as where a building interior or a city is being depicted in a video game, the processing burden is extremely great. Level of detail systems are typically used to facilitate practical working solutions, whereby the polygon mesh model is optimized to an amount of complexity which is suited for the part of the scene being depicted. For example, parts of the scene in the distance are depicted with less fine detail than parts of the scene in the foreground. A level of detail image processing system is able to take a complex polygon mesh and optimize that by reducing the number of vertices in the mesh. The resulting images rendered from the optimized polygon mesh do not accurately depict the scene since the polygon has been optimized, however, in many cases this is acceptable. Since the optimized polygon mesh has fewer vertices, and so fewer polygons, the processing resources to render images and video from the polygon mesh are reduced.

The embodiments described below are not limited to implementations which solve any or all of the disadvantages of known image processing systems and level of detail image processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer-implemented method for forming an optimized three-dimensional model for a three-dimensional graphics image. The method comprises: obtaining the three-dimensional graphics image, the three-dimensional graphics image represented as at least one polygon mesh having a plurality of vertices connected by edges. The method selects one or more of the vertices to be removed by a decimation operation, the selection based on an amount of change in the polygon mesh introduced as a result of the decimation operation. The amount of change is computed using information about intersections where two different faces of the polygon mesh pass through one another.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1A:
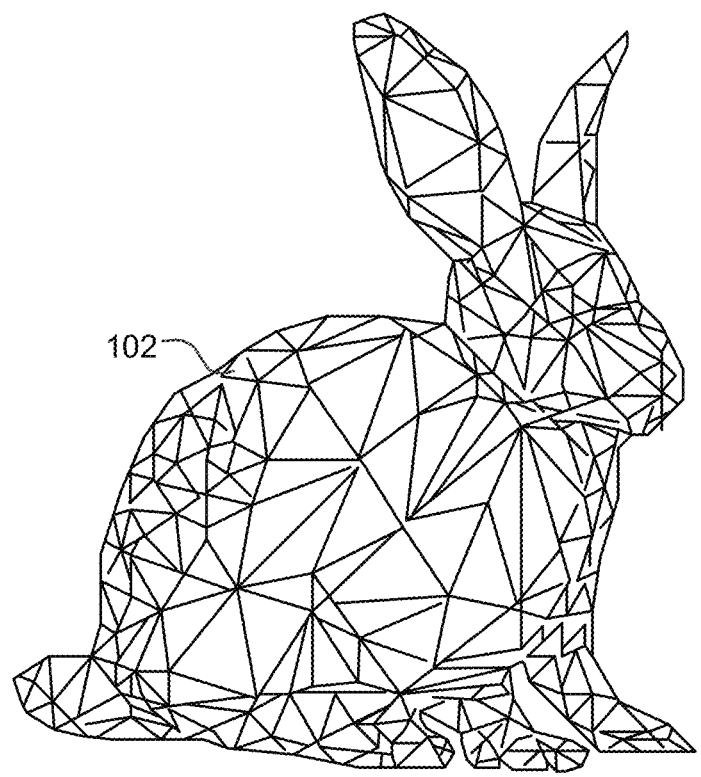
FIG. 1A shows a polygon mesh of a rabbit.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In an example there is a computer-implemented method for forming an optimized three-dimensional model for a three-dimensional graphics image, the method comprising: obtaining the three-dimensional graphics image, the three-dimensional graphics image represented as at least one polygon mesh having a plurality of vertices connected by edges; and selecting one or more of the vertices to be removed by a decimation operation, the selection based on an amount of change in the polygon mesh introduced as a result of the decimation operation; and where the amount of change is computed using information about intersections where two different faces of the polygon mesh pass through one another.

A decimation operation is a process which removes one or more vertices from a polygon mesh model. A non-exhaustive list of examples of decimation operation is: vertex clustering, vertex removal, polygon removal, edge collapse, half-edge collapse. The examples described herein use any known or future type of decimation operation.

By using the information about intersections it is possible to optimize the three-dimensional model in an intelligent manner, so that a decimation operation on one or more selected vertices which will result in little image error are used as opposed to the same decimation operation on other possible vertices which give higher image error. The image error is the inaccuracy in depiction of the object or scene that the three-dimensional model represents, in images or video rendered from the three-dimensional model. In this way the resulting optimized polygon mesh has less complexity than the initial polygon mesh but is still able to depict the object or scene well.

By using the information about intersections, the optimization is graceful, that is, the loss of accuracy proceeds gradually rather than in step changes, even where there is interaction between two or more polygon meshes, or between different parts of the same polygon mesh. In a scene comprising many objects there are typically several polygon meshes, one for each object. The objects are able to interact with one another such as where two or more objects (or part of an object) occupy some of the same space in a scene. In the case of a person wearing a shirt and a jacket the jacket and the shirt are different objects represented with separate polygon meshes. The polygon mesh of the jacket mostly contains the polygon mesh of the shirt, except where the jacket is open around the collar and front fastening where the shirt is revealed. In the case of a polygon mesh of a hand, the polygon mesh of the thumb is contained within polygon meshes of the fingers in some hand poses. Previous level of detail image processing systems are unable to cope well with this type of situation, where two or more objects or parts of an object interact. In this way a level of detail image processing system is given which optimizes polygon meshes and so facilitates high quality video graphics performance in real time, even where two or more objects or parts of object depicted in the video interact.

In various examples, an intersection comprises a line of contact between two different faces of the polygon mesh where the faces pass through one another. That is, an intersection is not an edge of the mesh joining two vertices. Using these intersections is found to be an effective way to identify and deal with situations where two different meshes, or parts of a mesh, interact.

In some cases the model comprises at least two polygon meshes as mentioned above in the case of the jacket and shirt.

In some cases the amount of change is computed using information about the number of intersections. The number of intersections gives an indication of the amount of image error which is relatively fast and efficient to compute.

In some cases the intersections are detected by searching for lines of contact between pairs of faces of the polygon mesh where the faces pass through one another, and wherein the amount of change is computed using any one or more of: information about lengths of lines, information about an area of a two dimensional closed shape formed from the lines. These are various ways in which an image error is estimated in a relatively fast and accurate manner.

An example comprises detecting the intersections by searching for lines of contact between pairs of faces of the polygon mesh where the faces pass through one another, and wherein the amount of change is computed as the difference between the area of a closed two dimensional shape formed from the lines, before and after the decimation operation. This is found to be a particularly accurate and effective way of computing image error which is used to aid high quality polygon mesh optimization.

An example comprises, detecting the intersections by searching for pairs of faces of the polygon mesh where the faces pass through one another, and if no intersections are found, computing the amount of change as an amount of movement of a face of the mesh caused by the decimation operation. This improves efficiency since computing the amount of movement of a face of the mesh is computationally less expensive than using intersection information in some examples.

An example comprises computing the amount of change as an amount of movement of a face of the mesh caused by the decimation operation, aggregated with an amount of difference related to the intersections caused by the decimation operation. By aggregating two different measures of the error in this way robust working solutions are given.

In examples the amount of difference related to the intersections is a difference between an area of a closed two dimensional shape formed from lines of the intersections, before and after the decimation operation. This approach gives accurate results in the case of interactions between two meshes or parts of meshes.

In examples the method comprises carrying out the decimation operation and repeating the selection of one or more vertices and carrying out the associated decimation operation to optimize the three-dimensional model. By repeating the process in this way the number of vertices in the model is reduced further until a desired level of detail is reached. In examples, the method comprises rendering an image from the optimized three-dimensional model. The rendered image is used as part of a downstream application such as a video game, medical imaging application, or other interactive navigation of a three dimensional scene.

Figure 1B:
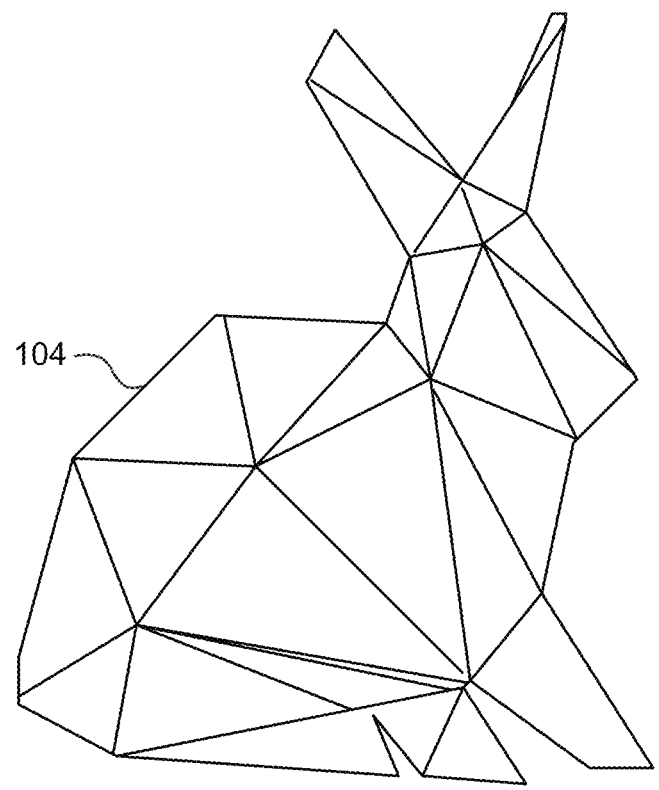
FIG. 1B shows the polygon mesh of FIG. 1a after optimization.

FIG. 1a is an example of a three-dimensional graphics image, in the form of a bunny rabbit, which has been tiled into a polygon mesh 102. In this example the polygons are triangles but other types of polygon may be used. A polygon mesh comprises a plurality of vertices linked by edges and where the edges form closed two dimensional polygons. FIG. 1b shows the polygon mesh of FIG. 1a after optimization so that the polygon mesh 104 has fewer vertices and as a consequence, fewer polygons. The level of detail of the polygon mesh of FIG. 1b is lower than the level of detail of the polygon mesh of FIG. 1a and so the computational resources to render an image or video from the polygon mesh of FIG. 1b is lower than that for FIG. 1a.

Figure 2:
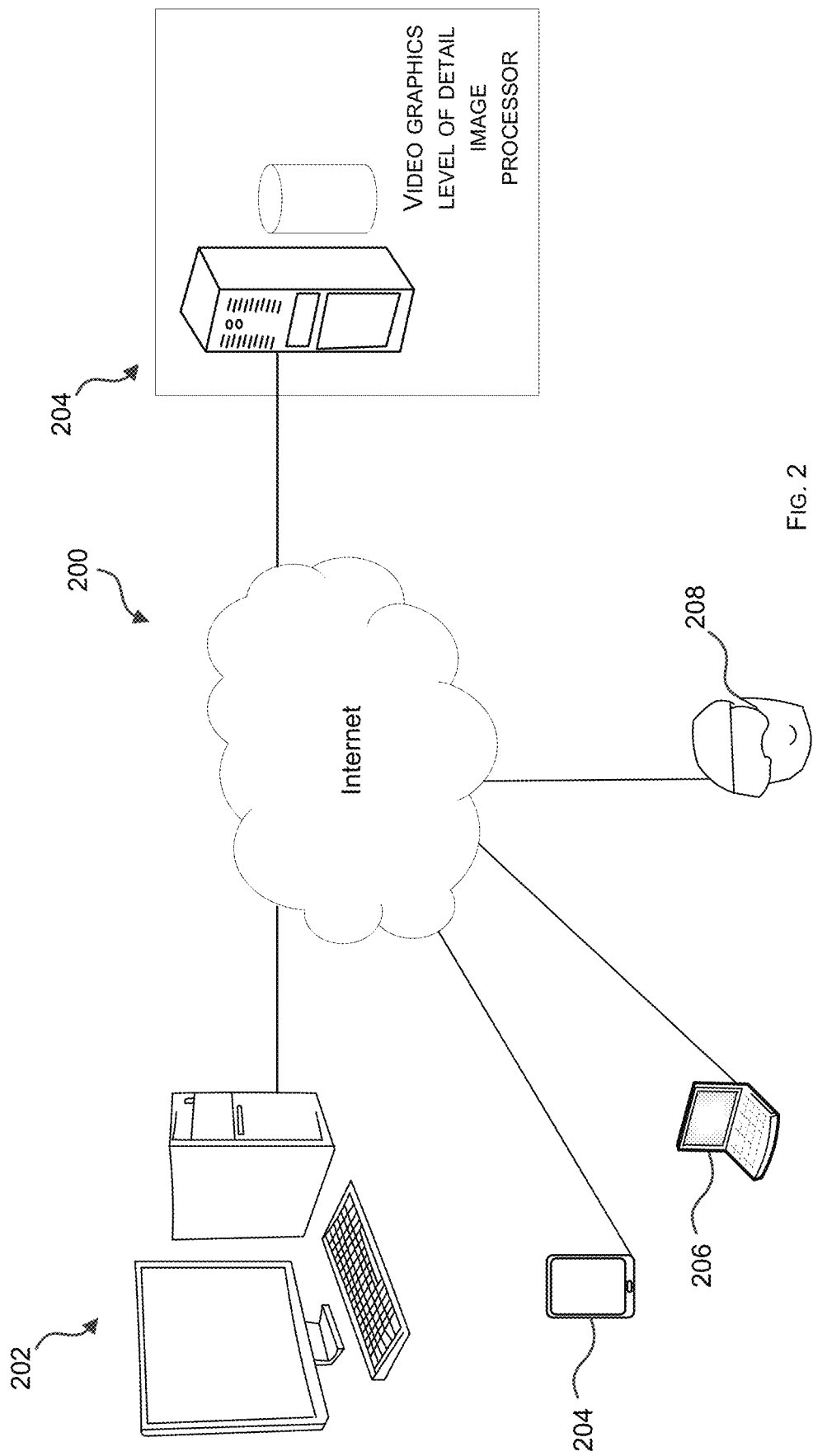
FIG. 2 is a schematic diagram of a video graphics level of detail image processor deployed as a cloud service.

FIG. 2 is a schematic diagram of a level of detail image processing system 204 deployed as a cloud service. The level of detail image processing system 204 comprises one or more computers and storage to store polygon meshes and images/videos. The level of detail image processing system 204 is connected to one or more end user computing devices such as desktop computer 202, smart phone 204, laptop computer 206 and augmented reality head worn computer 208. The level of detail image processing system 204 receives complex three dimensional images or models from an end user computing device such as in the form of models created using 3D modelling or computer aided design software or 3D scene reconstructions from an augmented reality system or depth camera system. For example, a content creator such as a 3D artist or a robotic system which creates scanned 3D models of environments, forms complex three dimensional images and models using suitable computing devices. The images and/or models are then uploaded to the level of detail image processing system 204. The level of detail image processing system forms an initial polygon mesh of the complex three dimensional model it receives and optimizes that complex polygon mesh as requested by the end user computing device, according to levels of detail requested by the end user computing device. The level of detail image processing system computes a large number of the optimized polygon meshes with different levels of detail, and the optimized polygon meshes are stored in a database. The end user computing devices 202, 204, 206, 208 are able to load one or more of the optimized polygon meshes from the database. If a polygon mesh with a desired level of detail is not present in the database the end user device sends a request to the level of detail image processing system 204 and it is created on-demand and stored in the database. The end user device which requested the particular level of detail polygon mesh is then able to access the mesh from the database, as are other end user computing devices.

The resulting optimized meshes are sent from the server 204 to the end user computing device 202, 204, 206, 208. Graphics accelerators at the end user computing devices render videos and/or images from the optimized meshes for display on a display screen or augmented reality display or other form of display. In an example the functionality of the level of detail image processor are provided "on-demand" through an application programming interface of the level of detail image processor.

Other implementations of the level of detail image processing functionality are also possible, where the resources for performing the technology are shared between the end user computing device 202, 204, 206, 208 and the server/database arrangement 204.

In some cases the video graphics level of detail image processor 204 is itself integral with an end user computing device. When a video game or other interactive three dimensional navigation application is installed at the end user computing device, the end user computing device computes the level of detail mesh models needed for the particular hardware of the end user computing device.

In some examples the level of detail image processor 204 is deployed in one or more computing devices of a manufacturer of three dimensional content navigation applications. The manufacturer creates the level of detail polygon mesh models using the level of detail image processor 204 and stores those within the applications it manufactures. When an end user purchases and installs the application the level of detail polygon mesh models are installed on the end user's computing device as part of installation of the application.

In some examples, the functionality of the level of detail image processor described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

It is recognized herein that problems occur with quality of images rendered from level of detail image processing systems where there is interaction between two or more polygon meshes, or between two or more parts of the same polygon mesh. For example, suppose there is a polygon mesh model of an automobile and this comprises a polygon mesh of the body of the vehicle as well as a polygon mesh of an engine within the vehicle. Suppose a level of detail image processing system is used to optimize the mesh models. If an optimization of the mesh representing the body of the vehicle leads to a situation where the mesh representing the engine of the vehicle protrudes through the mesh representing the body of the vehicle, there is a gross error which is visually disturbing. In another example, a first mesh model of a shirt worn on a person is within a second mesh model of a jacket worn by the same person. Optimization of the jacket mesh model is found to lead to inappropriate protrusion of the shirt mesh model through the jacket mesh model in some cases. The present technology enables polygon mesh optimization which ameliorates these types of errors.

Figure 3:
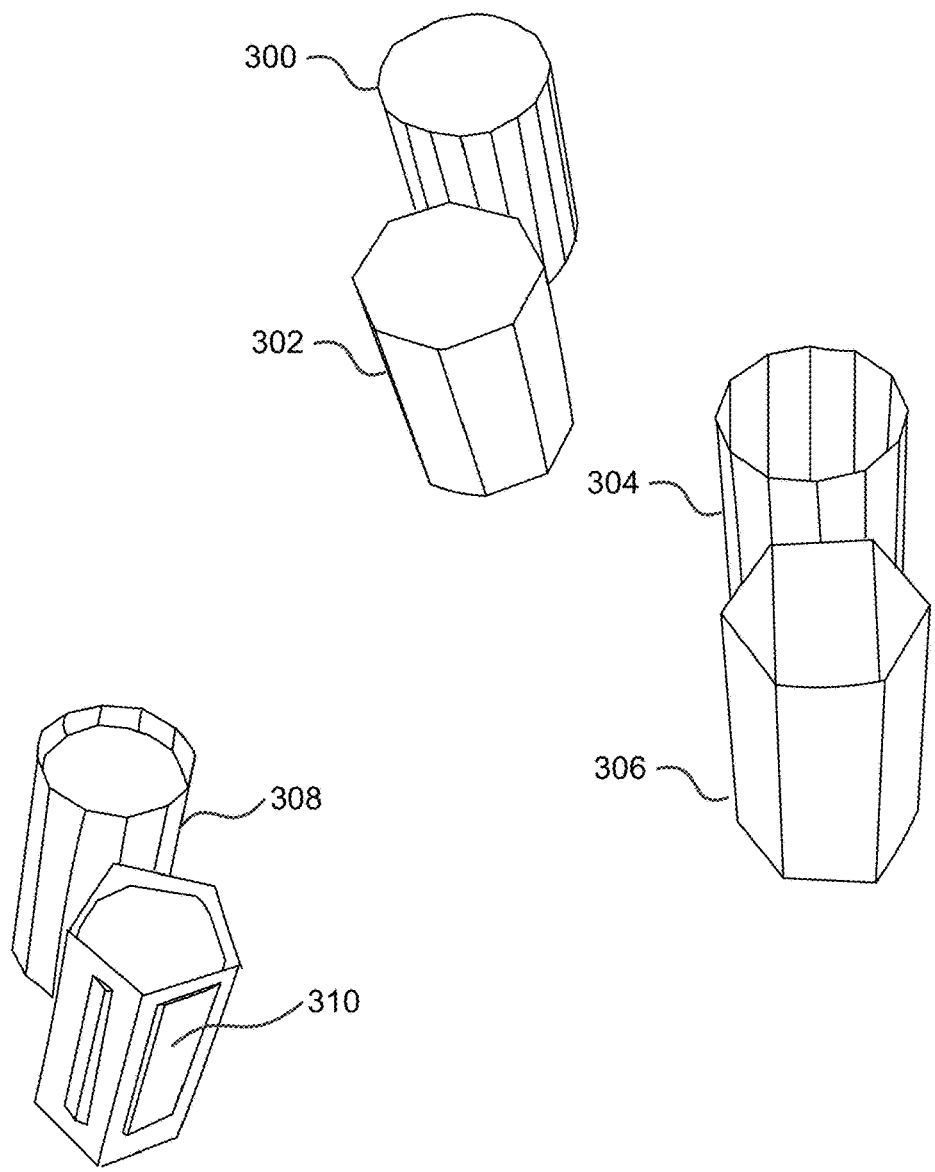
FIG. 3 is a schematic diagram of polygon mesh models of cylinder and a tube before and after optimization.

FIG. 3 illustrates mesh models of cylinders and tubes and shows interactions between these mesh models. A mesh model of a cylinder 300 is shown such as where the image processing system 204 has been sent a 3D image of a cylinder created using a computer aided design application, and has created a mesh model of the cylinder. The level of detail image processing system optimizes the cylinder mesh 300 to form mesh 302 which has fewer polygons than the cylinder mesh 300.

FIG. 3 shows a mesh model of a tube 304 such as where the image processing system has been sent a 3D image of a tube created using a computer aided design application and has created a polygon mesh of the tube. The level of detail image processing system optimizes the tube mesh 304 to form optimized tube mesh 306.

Suppose that the mesh model of cylinder 300 is inside the mesh model of the tube 304 as illustrated at 308 of FIG. 3. When the level of detail image processing system optimizes the composite mesh (comprising both the mesh model of the tube and the mesh model of the cylinder) the result is an optimized cylinder 310 which protrudes through the walls of the optimized tube at various places. This protrusion is not something which would happen in real life and is therefore a gross image error. It is recognized herein that the protrusion occurs because the optimization of each individual mesh is independent and the optimization does not take into account interactions between the meshes.

Figure 4:
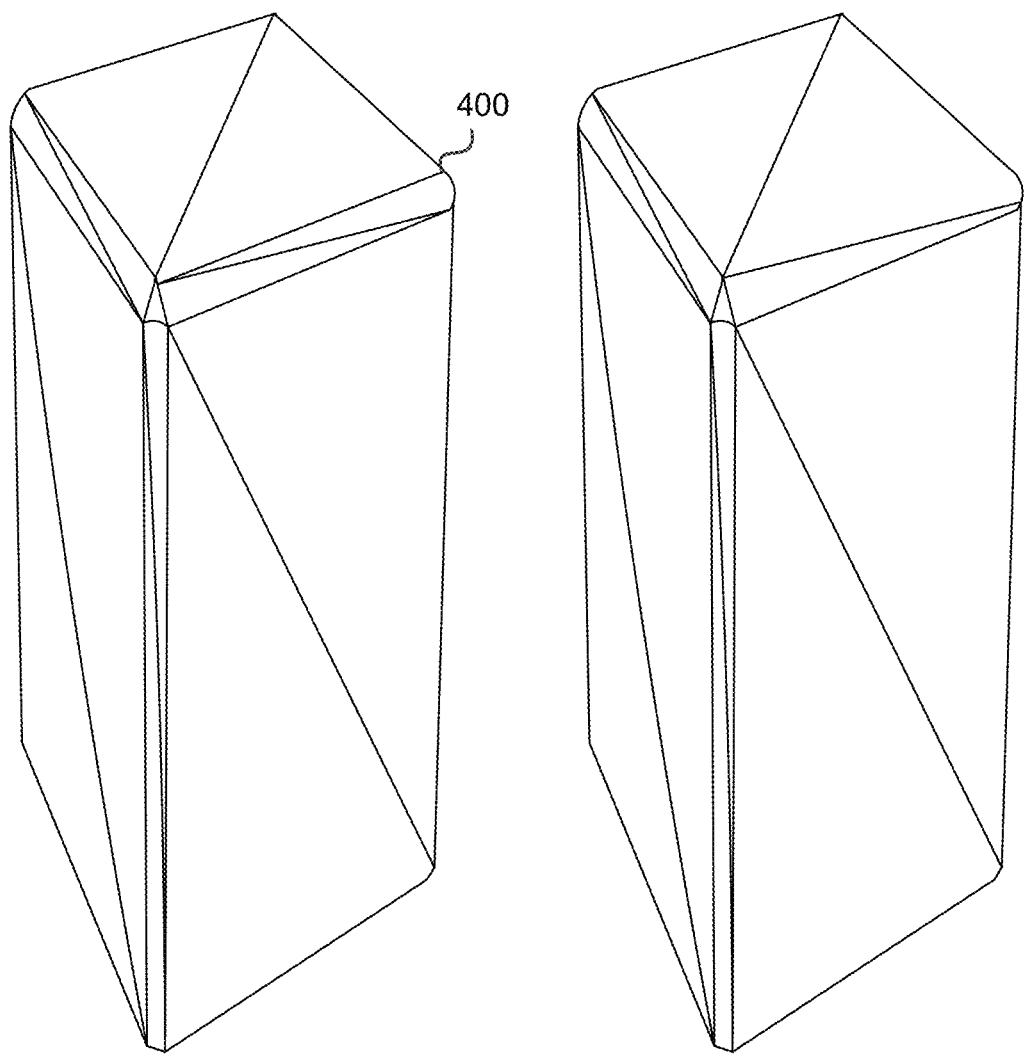
FIG. 4 is a schematic diagram of a polygon mesh model of a box with rounded corners before and after an edge collapse.

FIG. 4 is a schematic diagram of a polygon mesh model of a box with rounded corners before optimization (left hand side of FIG. 4) and after a single optimization step (right hand side). It is seen that the polygon mesh of the box on the left hand side includes several smaller polygons (in this case triangles) as compared with the sides of the box. These smaller polygons are needed in order to represent the rounded corners of the box. During an optimization step an edge collapse is carried out by selecting a pair of vertices of the mesh model on the left hand side to be amalgamated by removing one of the vertices of the pair and joining the edges of the mesh which previously terminated at the removed vertex, to the other vertex of the pair. In the example of FIG. 4 the edge collapse occurs at the top right hand front corner of the box where vertex 400 is present on the left hand side but not on the right hand side. The optimization process has selected the vertex to be removed very well in this case because the image error which results is low since the visual difference between the polygon meshes of FIG. 4 is small as the reader is able to observe by inspecting FIG. 4. In contrast, a poor quality optimization process may have selected a vertex on the bottom right of the polygon mesh to be removed and this would have resulted in a large image error since a large part of the side of the box would disappear.

Figure 5A:
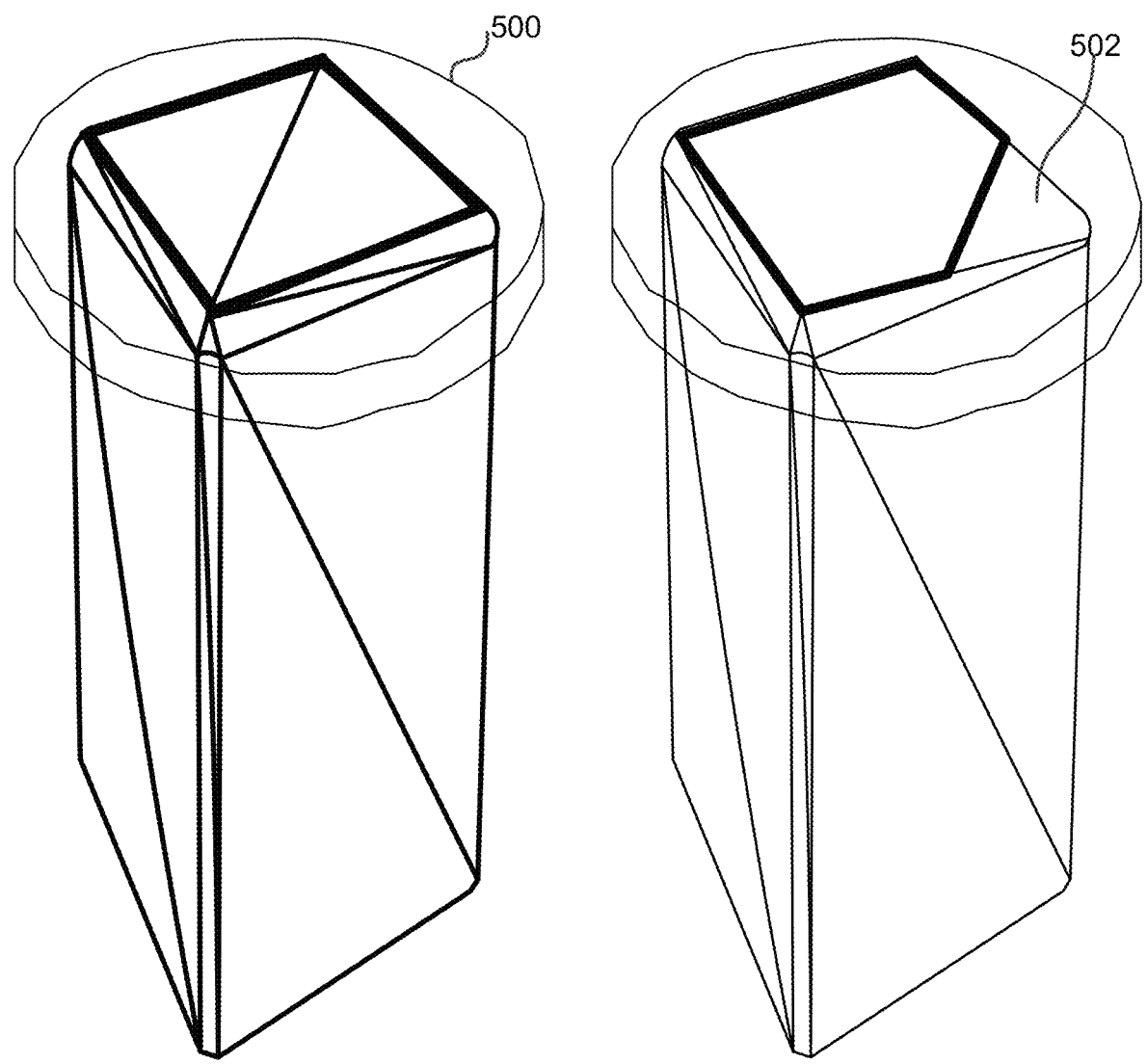
FIG. 5A is a schematic diagram of a polygon mesh model of a coin intersecting a polygon mesh model of a box with rounded corners, before and after optimization.

FIG. 5A illustrates a situation where a polygon mesh of a coin 500 is interacting with the polygon mesh of the box from FIG. 4. The left hand side of FIG. 5A shows the situation before optimization. The coin passes through the box, under the top surface of the box. Most of the top surface of the box protrudes over the coin but the rounded corners of the box dip down into the coin mesh volume and are not visible since they are within the coin mesh volume.

The coin is interacting with the box since faces of the sides of the box are passed through by the coin. A place where a polygon on the side of the box mesh is passed through by the coin mesh is referred to as an intersection. The intersection comprises a line of contact between the polygons on the side of the box mesh and the polygons on the flat top section of the coin mesh.

Figure 5B:
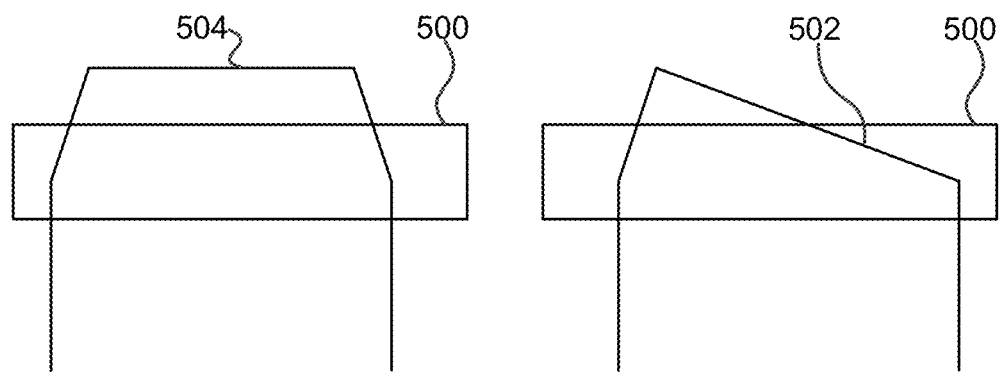
FIG. 5B is a schematic diagram of cross sections through part of the polygon mesh models of FIG. 5A.

Suppose that the polygon mesh of the box is optimized in the same way as illustrated in FIG. 4. The optimization does not take into account the presence of the coin mesh 500. The optimization carries out the edge collapse in the region of the top front right hand corner of the box mesh with the result that the top right hand front portion of the box drops down further into the coin mesh and is hidden from view (see region 502 of the coin in FIG. 4 which now obscures the top right part of the box). FIG. 5B illustrates this point further using cross sections of the polygon mesh of the coin and top part of the box. On the left hand side of FIG. 5B the situation is before the edge collapse has been carried out. The cross section through the box shows the lid of the box 504 protruding from the coin mesh 500. On the right hand side of FIG. 5B the situation is after the edge collapse has been carried out and here the right side of the box lid 502 drops down inside the coin mesh 500 as a result of the edge collapse. The end result is not satisfactory because there is now a large image error; the optimization has created the problem that the top right part of the box is incorrectly inside the coin mesh. The present technology recognizes that such errors are significant and develops a new metric to be used in the optimization process for selecting one or more vertices on which a decimation operation is to be carried out. For example, in the case of vertex clustering there is a huge number of possible different sub-sets of the vertices to be used in the clustering operation and these possible different sub-sets are to be selected between using the metric and any heuristics of the search algorithm. In the case of vertex removal, the vertices of the polygon mesh, of which there may be millions, are to be selected between using the metric and any heuristics of the search algorithm. In the case of polygon removal, one of the huge number of the polygons of the model is to be selected using the metric and any heuristics of the search algorithm. In the case of edge collapse or half-edge collapse a pair of vertices to be used in the edge collapse or half edge collapse is to be selected. The new metric takes into account interactions between two or more polygon meshes, or between two or more parts of the same polygon mesh. In the example of FIG. 5A there are two separate polygon meshes, one for a coin and one for a box. Suppose the coin and the box are linked by a hinge or chain so that they form a single object represented by a single polygon mesh. The coin part of the polygon mesh is able to interact with a different part of the same polygon mesh, which represents the box.

Figure 6:
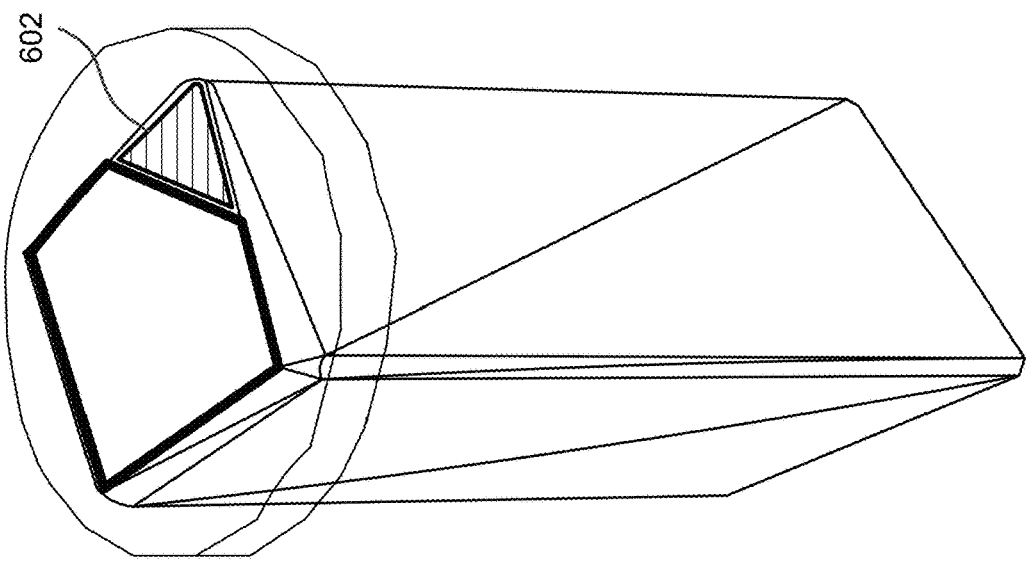
FIG. 6 is shows the polygon mesh model of FIG. 5A and with a closed two dimensional shape formed from intersections between the polygon mesh model of the coin and the polygon mesh model of the box.
Figure 6:
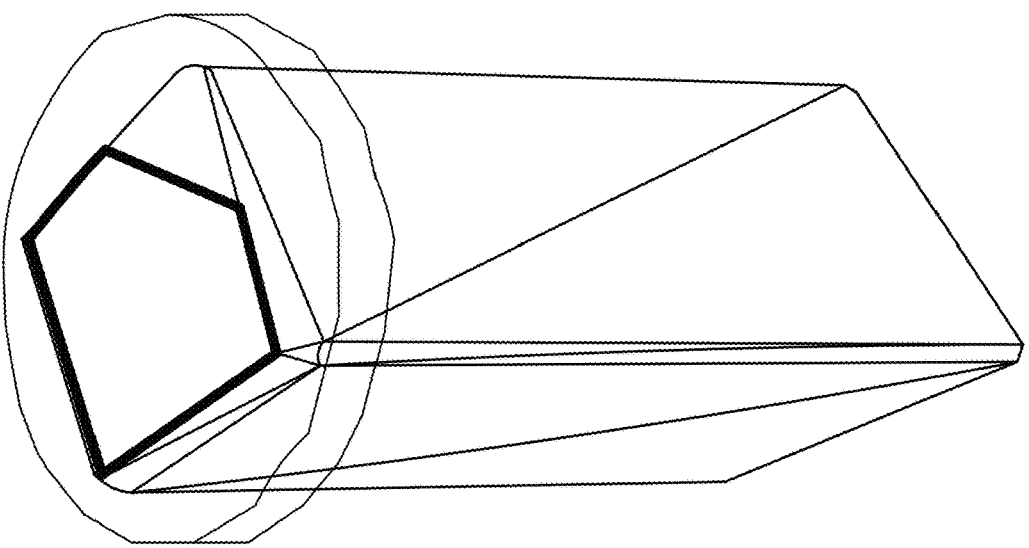
Figure 6:
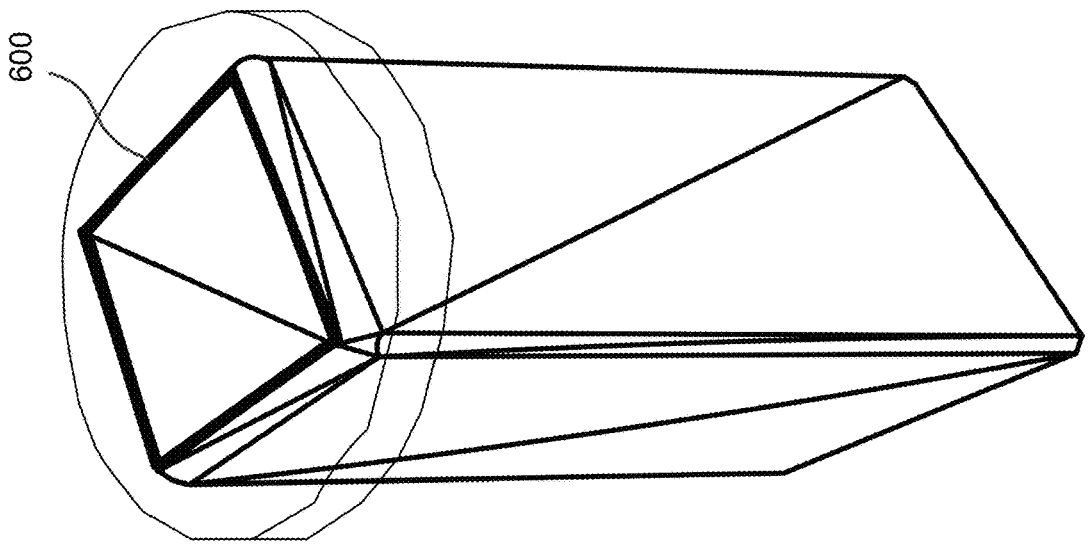

In an example, the new metric takes into account the interactions by measuring virtual borders before and after a proposed decimation operation. The optimization is then able to select vertices to use in a decimation operation according to a least amount of change in the virtual border measurement. A virtual border is a line of contact between two polygon faces, at a place where a polygon face passes through another polygon face. FIG. 6 shows a virtual border 600 in the situation from FIG. 5A Before the optimization step the virtual border 600 comprises a square formed from the lines where the rounded top of the box protrudes through the coin. After the optimization step the virtual border comprises a square with a missing corner, since part of the top of the box has now dropped inside the coin. The virtual border 600 comprising the square is a closed two dimensional shape and the area of this shape is computed. The area of this closed two dimensional shape formed by the virtual border is reduced after the edge collapse since triangle 602 is no longer within the closed two dimensional shape. The amount of change in the area of the closed two dimensional shape is used as the metric for selecting edge collapse candidates in some examples of the present technology. The amount of change in the area of the closed two dimensional shape formed by the virtual borders is found to give a good indication of image error and results in high quality three dimensional graphics images and videos depicting composite objects and/or articulated or deformable objects. The example of FIG. 6 is described with reference to edge collapse as the decimation operation for clarity and to aid understanding of the technology, but the use of the virtual borders is also applicable in the case of other types of decimation operation including but not limited to: vertex clustering, vertex removal, polygon removal.

Figure 7:
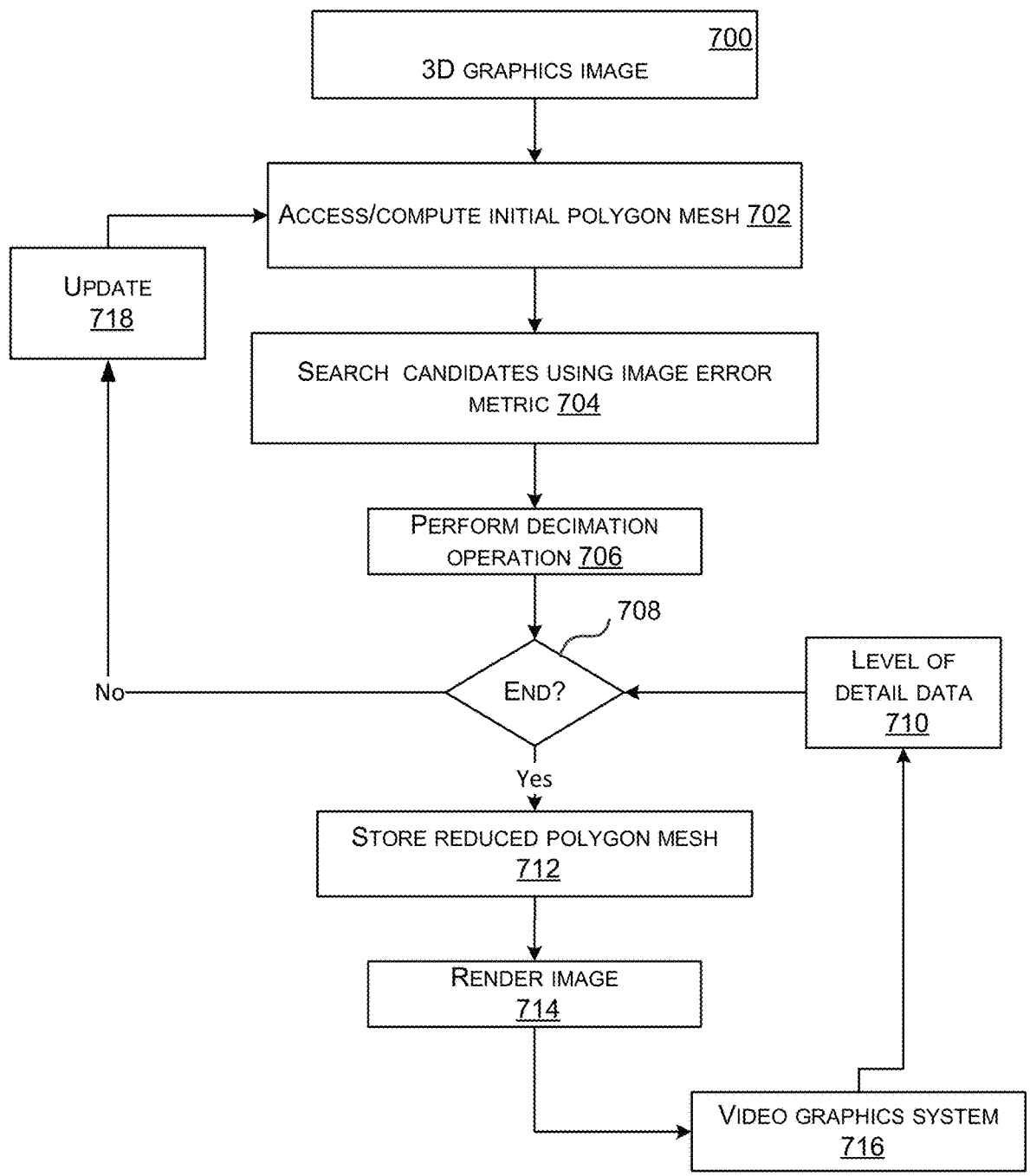
FIG. 7 is a flow diagram of a method of operation at an image processor such as that of FIG. 2.

FIG. 7 is a flow diagram of an example method at a level of detail image processor such as that of FIG. 2. A three dimensional graphics image 700 is received such as from a computer aided design software application which has been used by an operator to create the image, such as for a computer game or for a product or building being designed. In some cases the three dimensional image 700 is from a scene reconstruction engine which has built up the images from multiple depth images captured of the scene as the depth camera moves in the scene. The image processor either accesses from another system, or computes 702 itself, an initial polygon mesh depicting the three dimensional graphics image 700. This is done by fitting polygons onto the three dimensional graphics image and typically results in a highly complex initial polygon mesh comprising potentially millions of polygons of different sizes and orientations.

The image processor carries out an optimization of the initial polygon mesh in order to simplify the initial polygon mesh. To do this a heuristic process is used which comprises searching 704 for one or more vertices to be used in a decimation operation using an image error metric. A brute force search of the entire search space is typically not computationally tractable in working time scales. This is because the brute force search space comprises each possible candidate comprising a vertex or combination of vertices in the polygon mesh. The brute force search comprises computing, for each possible candidate, the image error metric. Since the number of candidates is extremely large and since the image error metric takes time and resources to compute the process is typically not possible in real time (such as at thirty frames per second). The image error metric takes into account intersections where two different faces of a polygon mesh pass through one another. A variety of different possible heuristic search processes are known and any of these are used; that is, the technology is not limited to a particular form of heuristic search. In an example, a vertex is selected at random from a region of the polygon mesh which has high density of vertices. A search is carried out to find another vertex to be used for an edge collapse with the current vertex. The search begins by examining immediate neighbors of the current vertex to find a vertex where an edge collapse can be carried out which results in an image error which will be below a specified threshold. As soon as a suitable candidate is found, edge collapse is carried out. The process then repeats until a stopping condition is met such as a specified proportion of the vertices have been removed or until a specified amount of processing capacity or memory is used. Similar types of heuristic search are used for other types of decimation operation.

Once a candidate has been selected as a result of the search 704, the associated decimation operation is performed 706 and the image processor decides 708 whether to end the optimization process. To make this decision a stopping criterion is used such as a number of optimization steps reaching a threshold number or proportion of the vertices of the initial polygon mesh. The stopping criterion comprises level of detail data 710 received from a video graphics system 716 such as at one of the end user computing devices of FIG. 2. If the optimization process is to continue, the updated polygon mesh 718 is used in place of the initial polygon mesh 702 and the process of operations 704 and 706 and 708 repeat. If the level of detail desired has been reached the optimization ends and the reduced polygon mesh is stored 712. The reduced polygon mesh is used to render 712 one or more images or videos using any well known image renderer for rendering from polygon meshes. The rendered images and/or videos are made available to a video graphics system 716 such as the end user computing devices of FIG. 2 and are displayed to end users.

Figure 8:
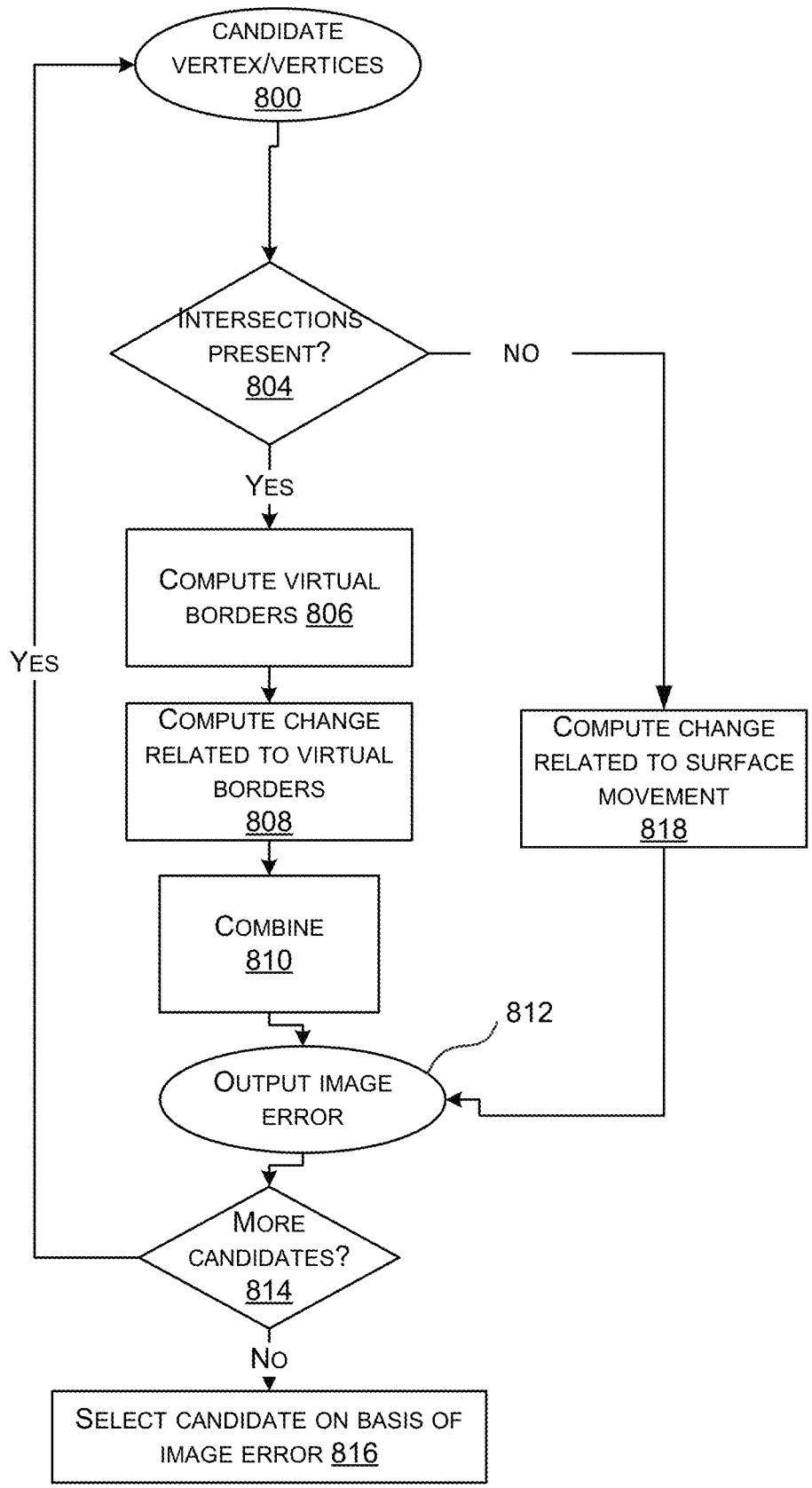
FIG. 8 is a flow diagram of part of the method of FIG. 7 in more detail.

FIG. 8 is a flow diagram of part of the search operation 704 of FIG. 7 in more detail. The search operation comprises assessing candidates comprising one or more vertices, such as pairs of vertices 800 of the polygon mesh, polygons of the mesh, sub-sets of the vertices, or individual vertices of the mesh. The search operation selects a candidate to be used for a potential decimation operation, according to the heuristic search algorithm being used. The image processor checks whether any intersections are present 804. This check comprises computing whether there are any faces of the polygon mesh which pass through other faces of the mesh or of another mesh. The image processor stores a record of the intersections it finds.

If no intersections are found the image processor computes 818 an amount of change in the polygon mesh which would result if the proposed decimation operation were carried out. The change is related to surface movement of the polygon mesh; that is an amount of movement of a surface of the polygon mesh which results from the proposed decimation operation. The amount of change computed at operation 818 is then output 812 as the amount of image error 812.

If intersections are found, the image processor computes 806 virtual borders of each intersection. A virtual border is a line of contact between a first face of a polygon mesh and another face of the polygon mesh passing through the first face. The lengths of the virtual borders are stored in some cases. The area of a closed two dimensional shape formed from the virtual borders of an intersection is computed and stored in some cases.

For each intersection which is found, the image processor computes 808 an amount of change related to the virtual borders associated with that intersection which occurs as a result of the proposed decimation operation. These amounts are then aggregated. The amount of change is an amount of change in an area of a two dimensional shape formed by the virtual borders, or the amount of change is an amount of change in the length of a perimeter of a two dimensional shape formed by the virtual borders, or the amount of change is a change in the number of lines making up the two dimensional shape formed by the virtual borders. Other amounts related to the virtual borders are used in some cases.

There is an optional combination step 810. In this case the operation 818 is computed even where intersections are found at check 804. The image processor combines the amounts computed from operations 808 and 818, that is the amount of change related to the virtual borders and the amount of change related to surface movement. The combination is made by addition which is a weighted addition in some cases, or another form of aggregation. Where the optional combination step 810 is used the resulting image error metric is found to be accurate. This is because even where the error caused by the virtual borders changing is minimal there is typically error caused by the surface changing present.

The image processor checks 814 whether it has more candidates to explore and assess. This check 814 is made according to criteria specified in the heuristic search algorithm. If there are more candidates to assess the process returns to the next candidate 800 and repeats. If there are no more candidates to assess the image processor selects 816 one of the candidates for which the image error has been computed. The selection is made on the basis of the computed image errors, such as by selecting a candidate with the lowest image error, or selecting a candidate with an amount of image error below a threshold.

Figure 9:
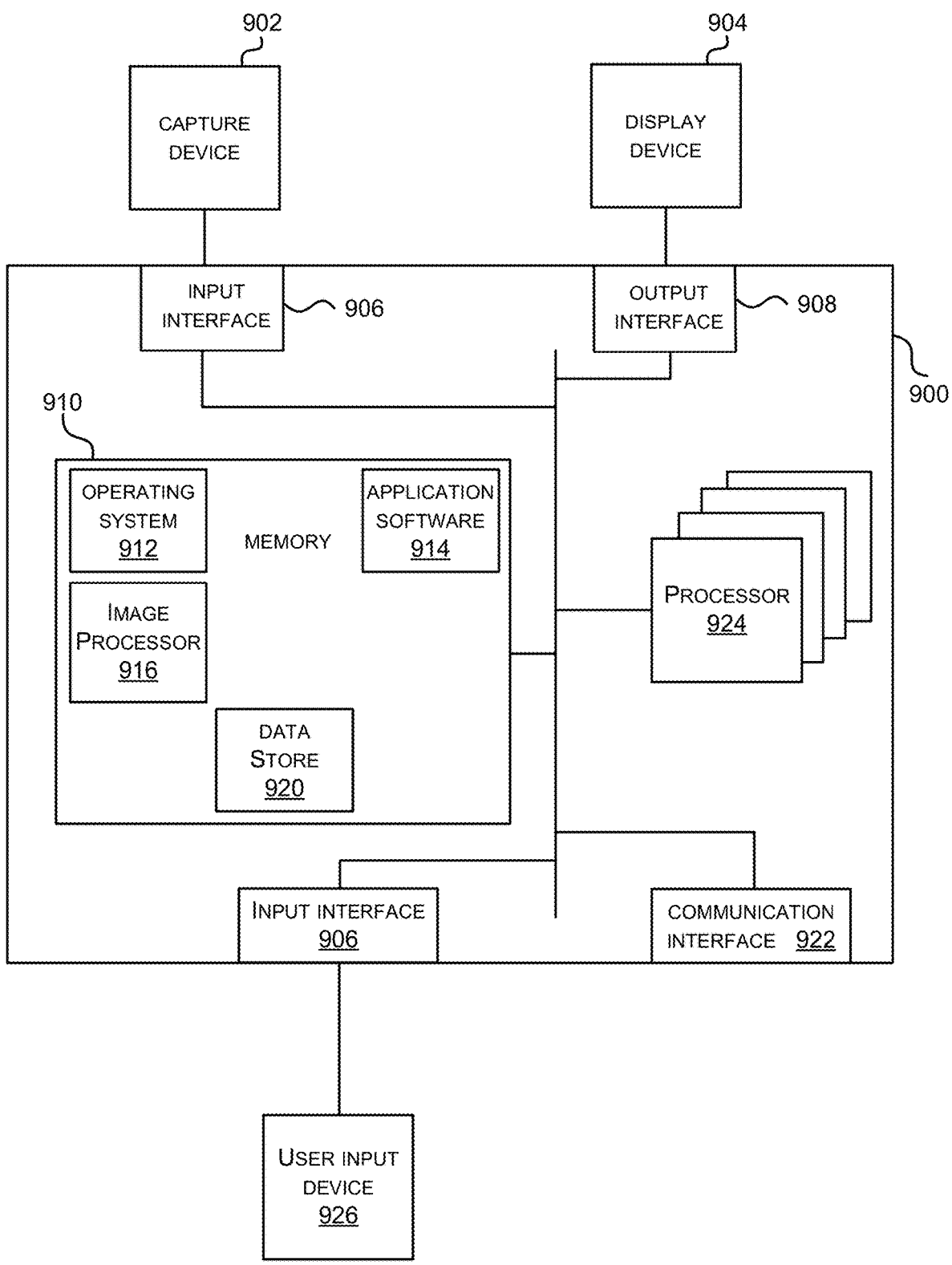
FIG. 9 illustrates an exemplary computing-based device in which embodiments of an image processor for video graphics level of detail are implemented.

FIG. 9 illustrates various components of an exemplary computing-based device 900 which are implemented as any form of a computing and/or electronic device, and in which embodiments of a level of detail image processor are implemented in some examples.

Computing-based device 900 comprises one or more processors 924 which are microprocessors, controllers or any other suitable type of processors for processing computer executable instructions to control the operation of the device in order to optimize polygon mesh models of three dimensional objects or scenes to enables images and/or videos to be rendered at high quality in real time. In some examples, the processors 924 include a graphics accelerator such as a video card or graphics processing unit. In some examples, for example where a system on a chip architecture is used, the processors 924 include one or more fixed function blocks (also referred to as accelerators) which implement a part of the method of FIGS. 7 and 8 in hardware (rather than software or firmware). Platform software comprising an operating system 912 or any other suitable platform software is provided at the computing-based device to enable application software 914 to be executed on the device such as a three dimensional video game, a computer aided design application, a medical image navigation application or other application for navigating three dimensional graphics and/or creating three dimensional graphics. An image processor 916 at the computing-based device 900 carries out level of detail image processing of one or more polygon mesh models as described herein. A data store 920 holds polygon mesh models, image and/or videos rendered from polygon mesh models, three dimensional images and/or videos created using computer aided design software, three dimensional scene reconstruction models created from depth images, image error values, heuristic search algorithms, image error metrics, virtual borders and other data.

The computer executable instructions are provided using any computer-readable media that is accessible by computing based device 900. Computer-readable media includes, for example, computer storage media such as memory 910 and communications media. Computer storage media, such as memory 910, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 910) is shown within the computing-based device 900 it will be appreciated that the storage is, in some examples, distributed or located remotely and accessed via a network or other communication link (e.g. using communication interface 922).

The computing-based device 900 also comprises an input interface 906 configured to receive data from a user input device, such as three dimensional graphics images, settings of parameter values, selections of search algorithms to be used and other user input. The input interface 906 is arranged to receive and process input from one or more devices, such as a user input device 926 (e.g. a mouse, keyboard, microphone or other sensor). In some examples the user input device 926 detects voice input, user gestures or other user actions and provides a natural user interface (NUI). In an embodiment a display device 904 acts as the user input device 926 if it is a touch sensitive display device. The input interface 906 receives input from a capture device 902 in some examples, such as a depth camera, web camera, video camera or other capture device. The captured depth or color images and videos may be used to compute a three dimensional scene reconstruction from which a polygon mesh model is computed and then optimized.

An output interface 908 outputs data to a display device 904 such as a projector of an augmented reality computing device, a display screen or other display device. The output data comprises images and videos rendered from the polygon meshes, and/or optimized polygon meshes. The output interface 908 outputs data to devices other than the display device 904 in some examples, e.g. a locally connected printing device.

Any of the input interface 906, output interface 908, display device 904 and the user input device 926 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computer-implemented method for forming an optimized three-dimensional model for a three-dimensional graphics image, the method comprising:

obtaining the three-dimensional graphics image, the three-dimensional graphics image represented as at least one polygon mesh having a plurality of vertices connected by edges; and selecting one or more of the vertices to be removed by a decimation operation, the selection based on an amount of change in the polygon mesh introduced as a result of the decimation operation;

and where the amount of change is computed using information about intersections where two different faces of the polygon mesh pass through one another.

The method described above wherein an intersection comprises a line of contact between two different faces of the polygon mesh where the faces pass through one another.

The method described above wherein the model comprises at least two polygon meshes and where an intersection comprises a line of contact between two faces, one from each of the polygon meshes, where the faces pass through one another.

The method described above wherein the amount of change is computed using information about the number of intersections.

The method described above comprising detecting the intersections by searching for lines of contact between pairs of faces of the polygon mesh where the faces pass through one another, and wherein the amount of change is computed using any one or more of: information about lengths of lines, information about an area of a two dimensional closed shape formed from the lines.

The method described above comprising detecting the intersections by searching for lines of contact between pairs of faces of the polygon mesh where the faces pass through one another, and wherein the amount of change is computed as the difference between the area of a closed two dimensional shape formed from the lines, before and after the decimation operation.

The method described above comprising, detecting the intersections by searching for pairs of faces of the polygon mesh where the faces pass through one another, and if no intersections are found, computing the amount of change as an amount of movement of a face of the mesh caused by the decimation operation.

The method described above comprising computing the amount of change as an amount of movement of a face of the mesh caused by the decimation operation, aggregated with an amount of difference related to the intersections caused by the decimation operation.

The method described above wherein the amount of difference related to the intersections is a difference between an area of a closed two dimensional shape formed from lines of the intersections, before and after the decimation operation.

The method described above comprising carrying out the decimation operation and repeating the selection of one or more of the vertices and carrying out the associated decimation operation to optimize the three-dimensional model.

The method described above comprising rendering an image from the optimized three-dimensional model.

A computer program comprising instructions which when executed on a computer implement the method described above.

An image processing apparatus for forming an optimized three-dimensional model for a three-dimensional graphics image, comprising:

a memory storing the three-dimensional graphics image, the three-dimensional graphics image represented as at least one polygon mesh having a plurality of vertices connected by edges; and a processor configured to select one or more of the vertices to be removed by a decimation operation, the selection based on an amount of change in the polygon mesh introduced as a result of the decimation operation;

and where the amount of change is computed using information about intersections where two different faces of the polygon mesh pass through one another.

The image processing apparatus described above where the processor is configured to detect the intersections by searching for lines of contact between pairs of faces of the polygon mesh where the faces pass through one another, and wherein the amount of change is computed using any one or more of: information about lengths of lines, information about an area of a two dimensional closed shape formed from the lines.

The image processing apparatus described above where the processor is configured to detect the intersections by searching for lines of contact between pairs of faces of the polygon mesh where the faces pass through one another, and wherein the amount of change is computed as the difference between the area of a closed two dimensional shape formed from the lines, before and after the decimation operation.

The image processing apparatus described above where the processor is configured to detect the intersections by searching for pairs of faces of the polygon mesh where the faces pass through one another, and if no intersections are found, computing the amount of change as an amount of movement of a face of the mesh caused by the decimation operation.

The image processing apparatus described above where the processor is configured to compute the amount of change as an amount of movement of a face of the mesh caused by the decimation operation, aggregated with an amount of difference related to the intersections caused by the decimation operation.

The image processing apparatus described above wherein the amount of difference related to the intersections is a difference between an area of a closed two dimensional shape formed from lines of the intersections, before and after the decimation operation.

The image processing apparatus described above where the processor is configured to carry out the decimation operation and repeat the selection of a pair of vertices and carryout the associated decimation operation to optimize the three-dimensional model.

One or more device-readable media with device-executable instructions that, when executed by a computing system, direct the computing system to perform operations comprising:

obtaining the three-dimensional graphics image, the three-dimensional graphics image represented as at least one polygon mesh having a plurality of vertices connected by edges;

selecting one or more of the vertices to be removed by a decimation operation, the selection based on an amount of change in the polygon mesh introduced as a result of the decimation operation;

and where the amount of change is computed using information about intersections between different parts of the mesh.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computer-implemented method for forming an optimized three-dimensional model for a three-dimensional graphics image, the method comprising:
    obtaining the three-dimensional graphics image, the three-dimensional graphics image represented as at least one polygon mesh having a plurality of vertices connected by edges; and
    selecting one or more of the vertices to be removed by a decimation operation, the selection based on an amount of change in the polygon mesh introduced as a result of the decimation operation and wherein the amount of change is computed using information about an intersection where a face of a first polygon and extends through a face of a second polygon of the polygon mesh such that the first polygon passes through the second polygon, the intersection comprising a line of contact between the face of the first polygon and the face of the second polygon.

2. The method of claim 1 comprising carrying out the decimation operation and repeating the selection of one or more of the vertices and carrying out the decimation operation to optimize the optimized three-dimensional model.

3. The method of claim 2 comprising rendering an image from the optimized three-dimensional model.

4. The method of claim 1 wherein the amount of change is computed using information about lengths of the line of contact and information about an area of a two dimensional closed shape formed from the line of contact.

5. The method of claim 1 wherein the optimized three-dimensional model comprises at least two polygon meshes and where an intersection comprises a line of contact between two faces, one from each of the polygon meshes, where the faces pass through one another.

6. The method of claim 1 wherein a number of intersections provides an indication of an amount of image error.

7. The method of claim 1 comprising detecting the intersection by searching for the line of contact between the face of the first polygon and the face of the second polygon, and wherein the amount of change is computed using any one or more of: information about lengths of the line of contact, information about an area of a two dimensional closed shape formed from the line of contact.

8. The method of claim 1 comprising detecting the intersection by searching for the line of contact between the face of the first polygon and the face of the second polygon, and wherein the amount of change is computed as a difference between an area of a closed two dimensional shape formed from the line of contact, before and after the decimation operation.

9. The method of claim 1 comprising computing the amount of change as an amount of movement of a face of the polygon mesh caused by the decimation operation.

10. The method of claim 1 comprising computing the amount of change as an amount of movement of a face of the polygon mesh caused by the decimation operation, aggregated with an amount of difference related to the intersection caused by the decimation operation.

11. The method of claim 10 wherein the amount of difference related to the intersections is a difference between an area of a closed two dimensional shape formed from line of intersection, before and after the decimation operation.

12. The method of claim 1, wherein an intersection is not an edge of the polygon mesh joining two vertices.

13. An image processing apparatus for forming an optimized three-dimensional model for a three-dimensional graphics image, comprising:
    a memory storing the three-dimensional graphics image, the three-dimensional graphics image represented as at least one polygon mesh having a plurality of vertices connected by edges; and
    a processor configured to select one or more of the vertices to be removed by a decimation operation, the selection based on an amount of change in the polygon mesh introduced as a result of the decimation operation, and wherein the amount of change is computed using information about an intersection where a face of a first polygon and extends through a face of a second polygon of the polygon mesh such that the first polygon passes through the second polygon, the intersection comprising a line of contact between the face of the first polygon and the face of the second polygon.

14. The image processing apparatus of claim 13 wherein the amount of change is computed using any one or more of: information about lengths of lines, and information about an area of a two dimensional closed shape formed from the line of intersection.

15. The image processing apparatus of claim 13 where the processor is configured to detect the intersection by searching for the line of contact between the face of the first polygon and the face of the second polygon, and wherein the amount of change is computed as a difference between an area of a closed two dimensional shape formed from the line of contact, before and after the decimation operation.

16. The image processing apparatus of claim 13 where the processor is configured to compute the amount of change as an amount of movement of a face of the polygon mesh caused by the decimation operation.

17. The image processing apparatus of claim 13 where the processor is configured to compute the amount of change as an amount of movement of a face of the polygon mesh caused by the decimation operation, aggregated with an amount of difference related to the intersection caused by the decimation operation.

18. The image processing apparatus of claim 17 wherein the amount of difference related to the intersection is a difference between an area of a closed two dimensional shape formed from the line of intersection, before and after the decimation operation.

19. The image processing apparatus of claim 13 where the processor is configured to carry out the decimation operation and repeat the selection of a pair of vertices and carryout out the decimation operation to optimize the three-dimensional model.

20. One or more computer-readable storage devices that, when executed by a computing system, direct the computing system to perform operations comprising:
- obtaining a three-dimensional graphics image, the three-dimensional graphics image represented as at least one polygon mesh having a plurality of vertices connected by edges; and
- selecting one or more of the vertices to be removed by a decimation operation, the selection based on an amount of change in the polygon mesh introduced as a result of the decimation operation, and wherein the amount of change is computed using information about an intersection where a face of a first polygon and extends through a face of a second polygon of the polygon mesh such that the first polygon passes through the second polygon, the intersection comprising a line of contact between the face of the first polygon and the face of the second polygon.

* * * * *